(12) United States Patent
Haug

(10) Patent No.: US 11,052,722 B2
(45) Date of Patent: Jul. 6, 2021

(54) AIR-CONDITIONING SYSTEM

(71) Applicant: MAHLE International GmbH, Stuttgart (DE)

(72) Inventor: Joachim Michael Haug, Mundelsheim (DE)

(73) Assignee: MAHLE International GmbH, Stuttgart (DE)

( * ) Notice: Subject to any disclaimer, the term of this patent is extended or adjusted under 35 U.S.C. 154(b) by 246 days.

(21) Appl. No.: 15/977,705

(22) Filed: May 11, 2018

(65) Prior Publication Data
US 2018/0257453 A1 Sep. 13, 2018

Related U.S. Application Data

(63) Continuation of application No. PCT/EP2016/076736, filed on Nov. 4, 2016.

(30) Foreign Application Priority Data

Nov. 11, 2015 (DE) ..................... 10 2015 222 267.5

(51) Int. Cl.
*B60H 1/00* (2006.01)
*F25B 25/00* (2006.01)
(Continued)

(52) U.S. Cl.
CPC ......... *B60H 1/004* (2013.01); *B60H 1/00028* (2013.01); *B60H 1/00042* (2013.01);
(Continued)

(58) Field of Classification Search
CPC ................ B60H 1/004; B60H 1/00385; B60H 1/00392; B60H 1/32284; B60H 1/22;
(Continued)

(56) References Cited

U.S. PATENT DOCUMENTS 3,853,172 A * 12/1974 McFarlan ................. F24F 3/10
165/210
5,421,169 A * 6/1995 Benedict ............ B60H 1/00007
62/244

(Continued)

FOREIGN PATENT DOCUMENTS

CN 101551175 A 10/2009
CN 104185562 A 12/2014
(Continued)

*Primary Examiner* — Joel M Attey
*Assistant Examiner* — For K Ling
(74) *Attorney, Agent, or Firm* — Muncy, Geissler, Olds & Lowe, P.C.

(57) ABSTRACT

An air-conditioning system, in particular for a motor vehicle, having a refrigerant circuit, which has an evaporator and a condenser, and a coolant circuit, wherein the refrigerant circuit and the coolant circuit are thermally coupled to each other, in particular in the region of the evaporator and in the region of the condenser, wherein the coolant circuit has a line system having junctions, wherein a heating body, a cooling body, an outside heat exchanger, an additional heat source, a first bypass line, and a second bypass line are integrated into the line system, wherein the first bypass line bypasses the additional heat source from the cooling body to the outside heat exchanger, and/or the second bypass line bypasses the additional heat source from the heating body to the outside heat exchanger.

16 Claims, 5 Drawing Sheets

(51) Int. Cl.
  *F25B 29/00* (2006.01)
  *B60H 1/32* (2006.01)
  *F25B 40/00* (2006.01)

(52) U.S. Cl.
  CPC ..... *B60H 1/00385* (2013.01); *B60H 1/00899* (2013.01); *F25B 25/005* (2013.01); *F25B 29/003* (2013.01); *B60H 2001/00961* (2019.05); *B60H 2001/3288* (2013.01); *F25B 40/00* (2013.01); *F25B 2400/16* (2013.01)

(58) Field of Classification Search
  CPC .............. B60H 1/2215; B60H 1/00278; B60H 1/32281; B60H 1/143; B60H 1/03; B60H 1/034; B60H 1/1434; B60H 2001/00164; B60H 2001/00121; B60H 2001/00961; F24F 3/10; F24F 3/06; F24F 3/08; F24F 11/41
  See application file for complete search history.

(56) References Cited

U.S. PATENT DOCUMENTS

| | | | | |
|---|---|---|---|---|
| 5,549,153 | A * | 8/1996 | Baruschke | B60H 1/00278 165/42 |
| 5,685,160 | A * | 11/1997 | Abersfelder | B60H 1/3223 62/114 |
| 6,112,547 | A * | 9/2000 | Spauschus | C09K 5/041 252/67 |
| 9,682,611 | B2 | 6/2017 | Haug | |
| 9,914,338 | B2 | 3/2018 | Nemesh | |
| 9,927,153 | B2 | 3/2018 | Matsumoto et al. | |
| 2004/0000161 | A1 * | 1/2004 | Khelifa | F25B 9/008 62/324.1 |
| 2006/0060340 | A1 * | 3/2006 | Busse | B60H 1/00278 165/202 |
| 2006/0218964 | A1 * | 10/2006 | Saito | F25B 6/04 62/500 |
| 2009/0249807 | A1 | 10/2009 | Nemesh et al. | |
| 2011/0146317 | A1 * | 6/2011 | Cline | F25B 30/06 62/238.7 |
| 2012/0174602 | A1 * | 7/2012 | Olivier | B60H 1/004 62/79 |
| 2012/0247716 | A1 * | 10/2012 | Galtz | B60H 1/00278 165/42 |
| 2013/0206360 | A1 | 8/2013 | Zhang et al. | |
| 2014/0110081 | A1 * | 4/2014 | Porras | F01P 11/04 165/11.1 |
| 2014/0318170 | A1 * | 10/2014 | Katoh | F28D 1/0408 62/324.5 |
| 2017/0197490 | A1 * | 7/2017 | Enomoto | B60H 1/00899 |

FOREIGN PATENT DOCUMENTS

| | | | |
|---|---|---|---|
| CN | 104837657 A | 8/2015 | |
| CN | 104890467 A | 9/2015 | |
| DE | 10 2009 059 240 A1 | 6/2011 | |
| DE | 10 2013 006 356 A1 | 10/2014 | |
| DE | 10 2014 205 030 A1 | 9/2015 | |
| EP | 1 291 206 A1 | 3/2003 | |
| JP | 11301254 A * | 11/1999 | ......... B60H 1/32284 |
| JP | H 11-301254 A | 11/1999 | |
| WO | WO 2013/023631 A1 | 2/2013 | |

* cited by examiner

AIR-CONDITIONING SYSTEM

This nonprovisional application is a continuation of International Application No. PCT/EP2016/076736, which was filed on Nov. 4, 2016, and which claims priority to German Patent Application No. DE 10 2015 222 267.5, which was filed in Germany on Nov. 11, 2015, and which are both herein incorporated by reference.

BACKGROUND OF THE INVENTION

Field of the Invention

The present invention relates to a climate control system, in particular for a motor vehicle.

Description of the Background Art

Climate control systems are standard equipment in many motor vehicles and are used in particular to regulate the temperature inside the vehicle cabin and thus contribute to the comfort of the vehicle occupants. In motor vehicles powered by an internal combustion engine, the vehicle cabin typically heated via the absorption of the waste heat of the internal combustion engine by a coolant circulating in a coolant circuit of the climate control system. In hybrid vehicles with an electric motor and an internal combustion engine, a correspondingly smaller amount of waste heat is generated overall, which is available for heating the vehicle cabin. The motors of vehicles purely electrically powered by a battery generate waste heat that can be used to a very limited extent and which arises in the electric motor and the power electronics. Therefore, for example, additional electric heaters are used in this type of vehicle, also referred to as an electric vehicle. A disadvantage of this solution is that additional electrical power is used in this case, which reduces the range of the electric vehicle due to the demands placed on the battery. For this reason, in many cases to heat the motor vehicle cabin, an external heat exchanger can be used, which takes energy from the outside air of the motor vehicle and releases it to the coolant circuit of the climate control system. Such a climate control system usually has a closed refrigerant circuit, in which a refrigerant circulates, comprising a compressor, an evaporator, an expansion valve, and at least one heat exchanger. The refrigerant circuit gives off heat to a coolant, which circulates in a likewise closed coolant circuit. The heat is then released from the coolant to a heating body, by means of which an airflow directed into the vehicle cabin air is heated.

The problem with this solution is that at low outside temperatures, especially at outside temperatures around the freezing point and below, condensate accumulating at the external heat exchanger can freeze. The heat transfer is thereby reduced and thus the efficiency of the external heat exchanger is reduced by an impeded heat transfer. If the thickness of the forming ice layer increases, moreover, the flow path of the air is increasingly blocked.

To counter this problem, appropriate climate control systems can often be switched to an operating mode to thaw the condensate formed at the external heat exchanger. During this "thawing" operating mode, the coolant circuit takes up practically no energy from the outside air. Alternatively, to bridge the duration of the "thawing" operating mode, heat energy can be provided from a buffer tank filled with a suitable transfer medium and, by being passed through the external heat exchanger, be used for its de-icing. A disadvantage of this solution is that the installation of a buffer tank in the motor vehicle requires additional installation space and increases the weight of the motor vehicle.

SUMMARY OF THE INVENTION

It is therefore an object of the present invention to provide an improved climate control system which can be operated in an energy-efficient manner even at low outside temperatures.

An exemplary embodiment of the invention relates to a climate control system, in particular for a motor vehicle, comprising a refrigerant circuit, which has an evaporator and a condenser, and a coolant circuit, wherein the refrigerant circuit and the coolant circuit are thermally coupled to each other, in particular in the region of the evaporator and in the region of the condenser, wherein the coolant circuit has a line system having junctions, wherein a heating body, a cooling body, an external heat exchanger, an additional heat source, a first bypass line, and a second bypass line are integrated into the line system, wherein the first bypass line bypasses the additional heat source from the cooling body to the external heat exchanger, and/or the second bypass line bypasses the additional heat source from the heating body to the external heat exchanger. A heated coolant, for example, cooling water, can flow to the heating body via the coolant circuit. In this case, an airflow guided over the surface of the heating body is heated. The heated airflow is preferably directed into a vehicle cabin and heats it. At the same time, energy for heating the coolant is removed from outside air, which flows along the external heat exchanger. In this way, an energy saving in the heating of the vehicle cabin is achieved in an advantageous manner. In electrically powered vehicles, this leads to an increase in range because the battery is spared. The additional heat source is turned on in particular when the outside air is insufficient as a heat source, for example, at low outside temperatures. The additional heat source is then used to heat the coolant. Particularly advantageous is the switching-on of the additional heat source when the climate control system operates in a "thawing" operating mode. In this operating mode, the outside air is not available as a heat source, because a louver blocks the external heat exchanger for the cold outside air to accelerate the thawing process. In so doing, a drop in the temperature of the heating body below a set setpoint value is counteracted by switching-on the additional heat source during the thawing process.

An embodiment of the climate control system provides that the additional heat source can be disposed in a region located upstream of the external heat exchanger in the flow direction, wherein a first junction which has a multi-way valve, controllable via a controller, and which connects the additional heat source and the external heat exchanger together, is disposed between the additional heat source and the external heat exchanger. As a result, the additional heat source is disposed within the coolant circuit in the immediate vicinity of the position of the external heat exchanger, and additional line pieces or valves can be dispensed with as much as possible.

In an embodiment of the climate control system, the line system of the coolant circuit is formed of at least two branches, a first branch and a second branch, wherein the first branch has at least the cooling body and a second junction, disposed in the flow direction between the cooling body and the additional heat source, and the second branch has at least the heating body and a third junction, disposed in the flow direction between the heating body and the additional heat source, wherein the first bypass line connects the second junction to the first junction and/or the second bypass line connects the third junction to the first junction such that the bypass lines bypass the additional heat source in each case to the first junction.

An embodiment of the climate control system provides that a fourth junction with a multi-way valve, controllable via a controller, is disposed in a region located upstream of the additional heat source in the flow direction, wherein the fourth junction is connected to the additional heat source and to the second junction.

In an exemplary embodiment of the climate control system, the second branch has a fifth junction with a multi-way valve, controllable via a controller, wherein the fifth junction is connected to the fourth junction and to the third junction and to the condenser.

An embodiment of the climate control system provides that the first branch has a sixth junction with a multi-way valve, controllable via a controller, wherein the sixth junction is connected to the cooling body and to the second junction and to the evaporator.

In an exemplary embodiment of the climate control system, the first branch has a seventh junction and an eighth junction, and the second branch has a ninth junction, wherein the seventh junction is connected to the external heat exchanger and to the eighth junction and to the ninth junction, wherein the eighth junction is connected to the cooling body and to the evaporator, wherein the ninth junction is connected to the condenser and to the heating body.

An embodiment of the climate control system provides that a first shut-off valve, controllable via a controller, is disposed between the seventh junction and the ninth junction, and/or a second shut-off valve, controllable via a controller, is disposed between the seventh junction and the eighth junction.

In an exemplary embodiment of the climate control system, the refrigerant circuit has an expansion tank, such as a refrigerant collector, disposed downstream of the condenser in a refrigerant flow direction, and/or an internal heat exchanger, such as inner heat exchanger, disposed downstream of the condenser and/or downstream of the expansion tank in the refrigerant flow direction, and/or an expansion valve, disposed upstream of the evaporator in the refrigerant flow direction, and/or compressor, disposed upstream of the condenser in the refrigerant flow direction.

A particularly advantageous embodiment of the climate control system provides that in a first operating mode "heating" of the climate control system, the additional heat source is turned off, the first shut-off valve is closed and the second shut-off valve is open, the multi-way valve located at the sixth junction is set such that coolant flows from the evaporator to the second junction and the coolant flow between the sixth junction and the cooling body is prevented, the multi-way valve located at the fifth junction is set such that coolant flows from the condenser via the fifth junction and the third junction to the heating body, wherein the coolant flow between the fifth junction and the fourth junction is prevented, the multi-way valve located at the fourth junction is set such that the coolant flow between the second junction and the fourth junction is prevented, the multi-way valve located at the first junction is set such that coolant flows from the second junction via the first bypass line and the first junction to the external heat exchanger and the coolant flow between the third junction and the first junction via the second bypass line is prevented.

In a further embodiment of the climate control system, in a second operating mode "cooling," the additional heat source is turned off, the first shut-off valve is open and the second shut-off valve is closed, the multi-way valve located at the sixth junction is set such that coolant flows from the evaporator to the sixth junction and the coolant flow between the sixth junction and the second junction is prevented, the multi-way valve located at the fifth junction is set such that the coolant flow between the fifth junction and the third junction and the heating body is prevented, wherein coolant flows from the condenser via the fifth junction to the fourth junction, the multi-way valve located at the fourth junction is set such that coolant flows from the fifth junction via the fourth junction and the additional heat source to the first junction, the multi-way valve located at the first junction is set such that coolant flows from the fourth junction via the additional heat source and the first junction to the external heat exchanger, wherein the coolant flow between the second junction and the first junction via the first bypass line and the coolant flow between the third junction and the first junction via the second bypass line are prevented.

An additional exemplary embodiment of the climate control system provides that in a third operating mode "reheating," the additional heat source is turned off, the first shut-off valve is closed and the second shut-off valve is open, the multi-way valve located at the sixth junction is set such that the coolant flow from the evaporator via the sixth junction to the cooling body is opened, wherein coolant flows from the evaporator via the sixth junction to the second junction, the multi-way valve located at the fifth junction is set such that coolant flows from the condenser via the fifth junction to the heating body, wherein the coolant flow from the fifth junction to the fourth junction is prevented, the multi-way valve located at the first junction is set such that the coolant flow between the third junction and the first junction via the second bypass line is prevented, wherein coolant flows from the second junction via the first bypass line and the first junction to the external heat exchanger.

In a further embodiment of the climate control system, in a fourth operating mode "auxiliary heating," the additional heat source is turned on, the first shut-off valve is closed and the second shut-off valve is open, the multi-way valve located at the sixth junction is set such that the coolant flow between the sixth junction and the cooling body and between the cooling body and the eighth junction is prevented, wherein coolant flows from the evaporator via the sixth junction to the second junction, the multi-way valve located at the fifth junction is set such that coolant flows from the condenser via the fifth junction to the fourth junction, wherein the coolant flow between the fifth junction and the third junction is prevented, the multi-way valve located at the fourth junction is set such that the coolant flow between the second junction and the fourth junction is prevented, wherein coolant flows from the condenser via the fifth junction, the fourth junction, and the additional heat source to the first junction, the multi-way valve located at the first junction is set such that coolant flows from the second junction via the first junction to the external heat exchanger, wherein coolant flows from the fourth junction via the additional heat source and the first junction to the heating body.

In a further embodiment of the climate control system, in a fifth operating mode "thawing," the additional heat source is turned on, the first shut-off valve is closed and the second shut-off valve is open, the multi-way valve located at the sixth junction is set such that the coolant flow between the sixth junction and the cooling body and between the cooling body and the eighth junction is prevented, wherein coolant flows from the evaporator via the sixth junction to the second junction, the multi-way valve located at the fifth junction is set such that coolant flows from the condenser via the fifth junction to the heating body, wherein the coolant flow from the fifth junction to the fourth junction is prevented, the multi-way valve located at the fourth junction is set such that coolant flows from the second junction via the fourth junction and the additional heat source to the first junction, the multi-way valve located at the first junction is set such that coolant flows from the fourth junction via the additional heat source and the first junction to the external heat exchanger, wherein the coolant flow between the second junction and the first junction via the first bypass line and the coolant flow between the third junction and the first junction via the second bypass line are prevented.

An additional embodiment of the climate control system provides that the additional heat source is an electric heat source, in particular an electric heating device. Electric heating devices offer the advantage that they can be switched on and off relatively quickly. In addition, they can be integrated simply into the coolant circuit and can be easily controlled.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
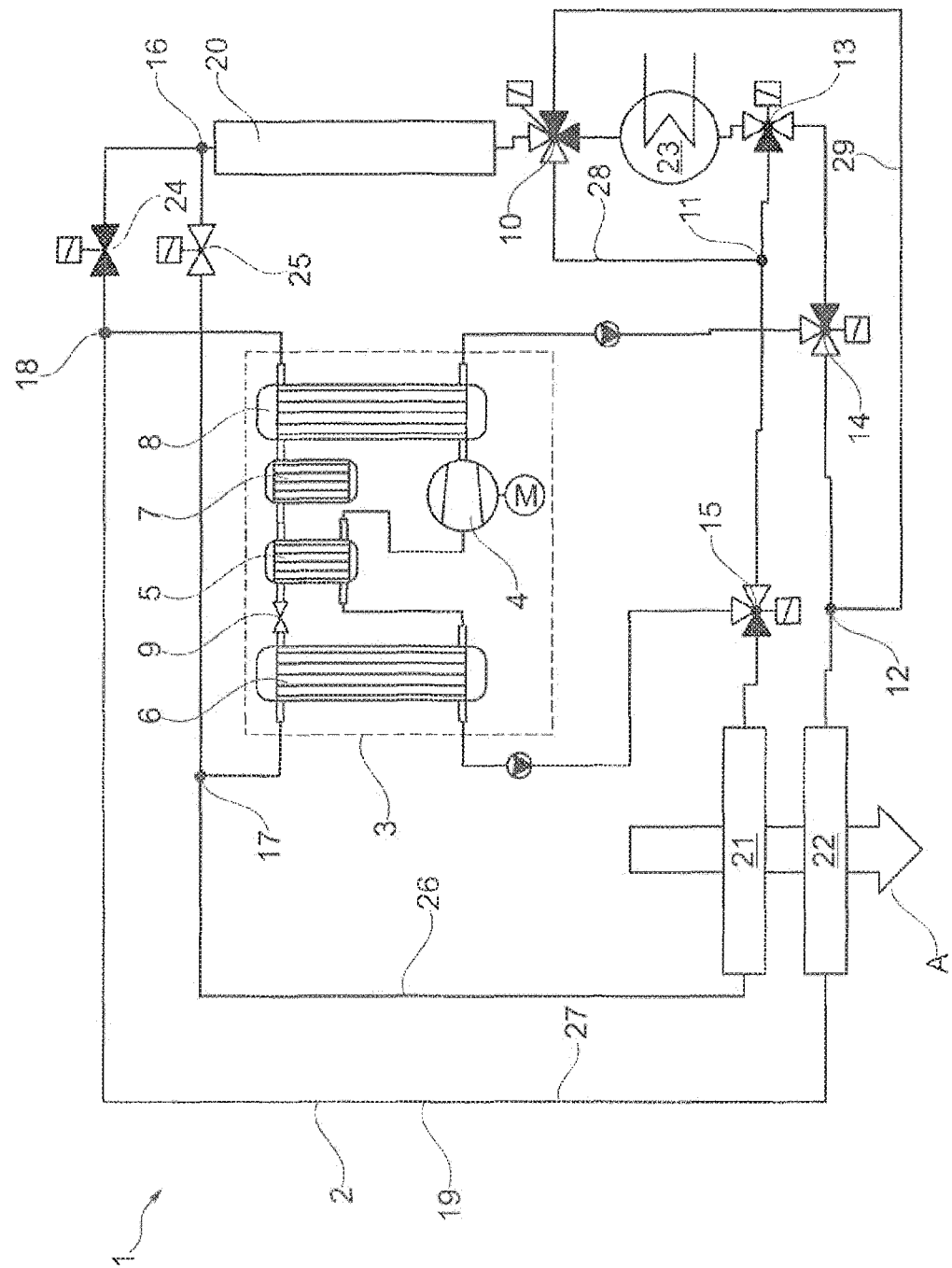
FIG. 1 is a circuit diagram of a coolant circuit of a climate control system of the invention in the operating mode "heating"

FIG. 1 shows a circuit diagram 1 of a climate control system. The climate control system by way of example is disposed in a motor vehicle. In this case, the climate control system can be used to heat and/or air-condition a cabin of the motor vehicle. Circuit diagram 1 has a coolant circuit 2 and a refrigerant circuit 3. Refrigerant circuit 3 is a closed circuit through which a refrigerant can flow. Refrigerant circuit 3 has inter alia a compressor 4, an internal heat exchanger 5, an evaporator 6, which operates by way of example as a chiller, expansion tank 7 equipped with a drying/filtering unit, an indirect condenser 8, and an expansion valve 9.

By way of example, the coolant circuit has nine junctions 10, 11, 12, 13, 14, 15, 16, 17, 18, at which line system 19 of coolant circuit 2 branches. Partially electronically controllable multi-way valves are located in the region of junctions 10, 11, 12, 13, 14, 15, 16, 17, 18. A coolant flowing through line system 19 of coolant circuit 2 can be directed by a controller via the control of the multi-way valves.

In addition, the coolant circuit has an external heat exchanger 20, a cooling body 21, a heating body 22, an additional heat source 23, as well as a first shut-off valve 24 and a second shut-off valve 25. Additional heat source 23 is disposed in the feed line of external heat exchanger 20.

During operation of the climate control system, outside air flows across external heat exchanger 20, wherein heat is removed from the air during heating/auxiliary heating and heat is released into the air in the case of cooling or reheating. In this case, external heat exchanger 20 supplies energy to coolant circuit 2 in the form of heat. Coolant circuit 2 is thermally coupled to refrigerant circuit 3 in the region of evaporator 6 and condenser 8. In this way, energy can be transferred from refrigerant circuit 3 to a coolant circulating in coolant circuit 2, for example, cooling water.

Additional heat source 23 is preferably an electric heating device that can be turned on and off depending on the operating mode of the climate control system. For this purpose, a control and regulating device can be provided which functions, for example, on the basis of measured temperatures of the coolant in coolant circuit 2 or of the outside air as an input control variable. Additional heat source 23 is used to provide heat in a "thawing" operating mode and in an "auxiliary heating" operating mode, in particular at low outside temperatures and/or when external heat exchanger 20 is iced over by frozen condensate.

Additional heat source 23 may have, for example, a power of 5 kW. In alternative embodiment variants of the climate control system, additional heat sources may be used, which have a power other than 5 kW or are adjustable as needed.

In coolant circuit 2, coolant flows to external heat exchanger 20 after flowing through heating body 22. If the outside temperature is too low to reach the setpoint temperature designated for heating body 22 and/or external heat exchanger 20 is iced over, additional heat source 23 is switched on.

Coolant circuit 2 has a first branch 26 and a second branch 27, and the different interconnection of these branches sets the climate control system in each case to the individual operating modes: "heating," "cooling," "reheating" (dehumidifying), "auxiliary heating," and "thawing" of external heat exchanger 20. Evaporator 6, cooling body 21, second junction 11, sixth junction 15, eighth junction 17, and second shut-off valve 25 are located in the region of first branch 26. Condenser 8, heating body 22, third junction 12, fifth junction 14, ninth junction 18, and first shut-off valve 24 are located in the region of second branch 27.

First branch 26 and second branch 27 overlap in the area of first junction 10, fourth junction 13, seventh junction 16, and external heat exchanger.

Additional heat source 23 is disposed between first junction 10 and fourth junction 13. Here, first junction 10 is disposed between additional heat source 23 and external heat exchanger 20.

Second junction 11 is disposed in the region of first branch 26 in the feed line of fourth junction 13. Sixth junction 15 and cooling body 21 are disposed in the region of first branch 26 in the feed line of second junction 11. A first bypass line 28, which bypasses additional heat source 23 from cooling body 21 to external heat exchanger 20, is disposed between second junction 11 and first junction 10.

Fifth junction 14 is disposed in the region of second branch 27 in the feed line of fourth junction 13. Third junction 12 and heating body 22 are disposed in the region of second branch 27 in the feed of fifth junction 14. A second bypass line 29, which bypasses additional heat source 23 from heating body 22 to external heat exchanger 20, is disposed between third junction 12 and first junction 10.

The interconnection of coolant circuit 2 is shown in a first operating mode "heating" in FIG. 1. Warm air, indicated by the arrow A, can flow into the vehicle cabin. Additional heat source 23 is turned off. First shut-off valve 24 is closed and second shut-off valve 25 is open. The coolant is heated at the external heat exchanger 20 and flows to evaporator 6. A multi-way valve located at sixth junction 15 is set such that coolant flows from evaporator 6 to second junction 11 but cannot flow to cooling body 21 connected to sixth junction 15. Coolant flows further from second junction 11 via first bypass line 28 to first junction 10. A multi-way valve located at first junction 10 is set such that coolant flows via first junction 10 to external heat exchanger 20. In addition, the multi-way valve located at first junction 10 blocks the inflow of coolant through second bypass line 29 to external heat exchanger 20.

A multi-way valve located at fourth junction 13 located in the feed line of additional heat source 23 is set such that no coolant is conducted via additional heat source 23. Additional heat source 23 is bypassed in this way.

A multi-way valve located at fifth junction 14, connected to condenser 8, heating body 22, and fourth junction 13, is set such that coolant flows from condenser 8 to heating body 22 but not to fourth junction 13 or not further to additional heat source 23.

Figure 2:
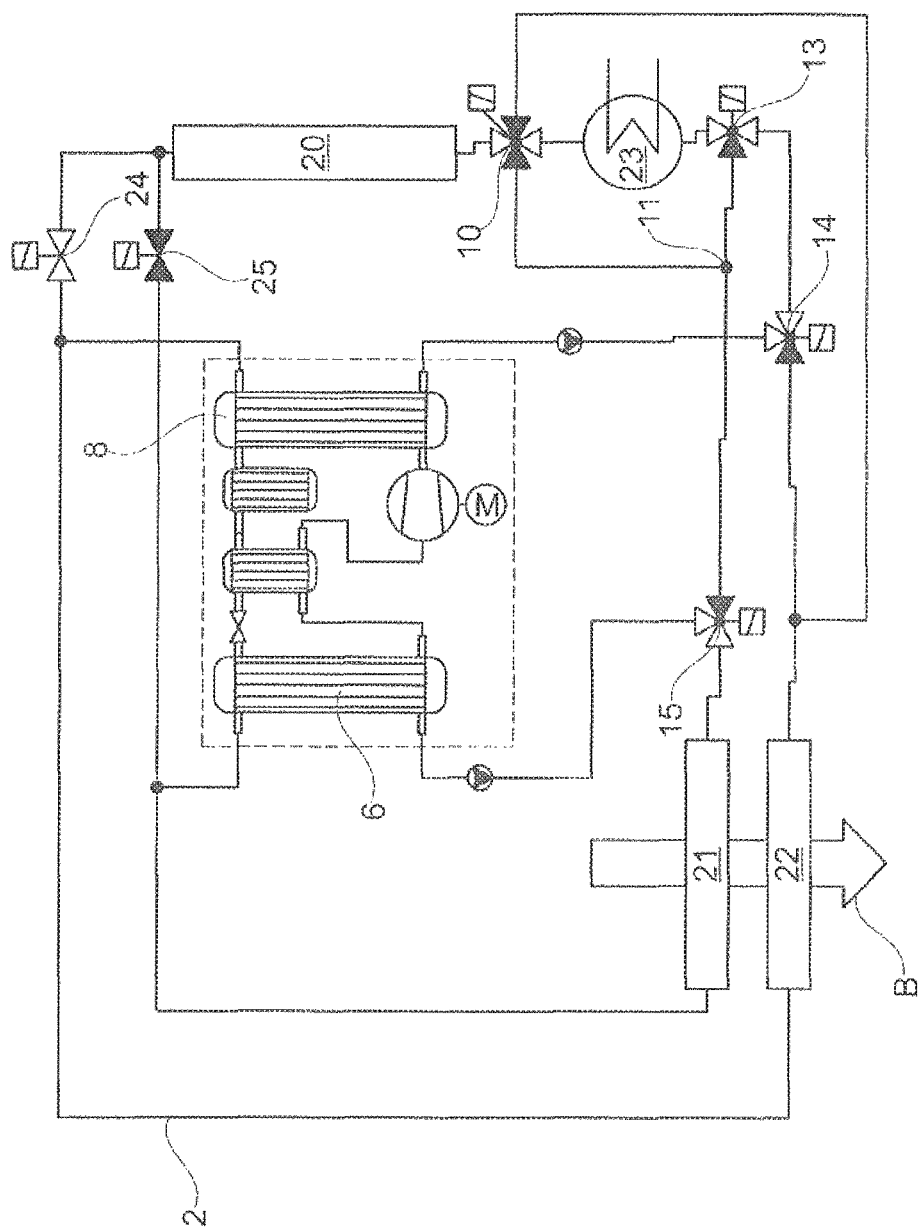
FIG. 2 is a circuit diagram of a coolant circuit of a climate control system according to FIG. 1 in the operating mode "cooling"

FIG. 2 shows the interconnection of a coolant circuit 2 of a climate control system according to FIG. 1 in a second operating mode "cooling." Identical parts are provided with the same reference numerals.

Cool air, indicated by the arrow B, can flow into the vehicle cabin. Additional heat source 23 is turned off. First shut-off valve 24 is open and second shut-off valve 25 is closed. The coolant is cooled at evaporator 6 and flows via sixth junction 15 to cooling body 21. The multi-way valve located at sixth junction 15 is set such that coolant does not flow from evaporator 6 or sixth junction 15 further to second junction 11 or to external heat exchanger 20.

The multi-way valve located at fifth junction 14 is set such that no coolant flows from fifth junction 14 to heating body 22. In this case, coolant flows from condenser 8 via fifth junction 14 and fourth junction 13 as well as via the switched-off additional heat source 23 and first junction 10 to external heat exchanger 20 and from external heat exchanger 20 via first shut-off valve 24 to condenser 8.

Figure 3:
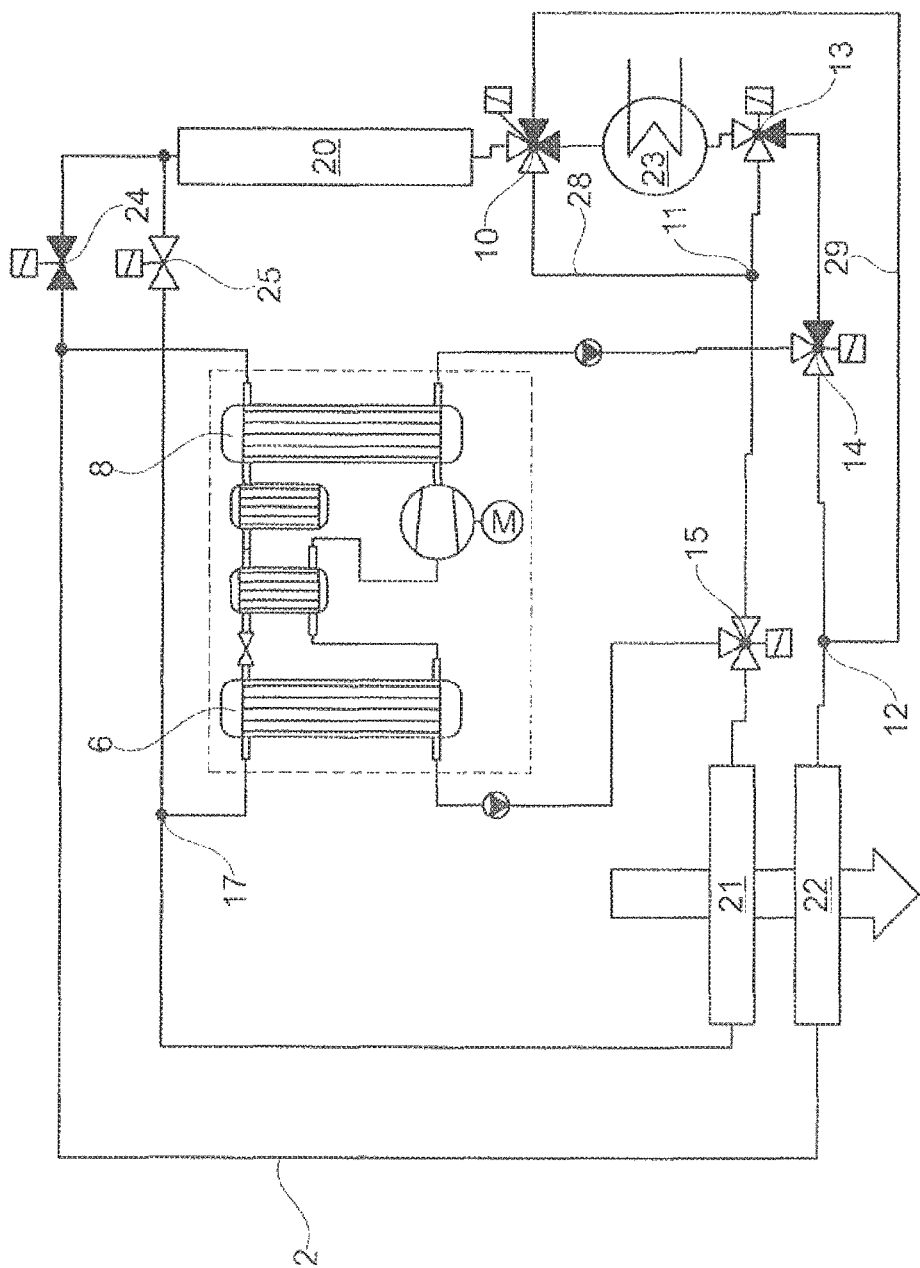
FIG. 3 is a circuit diagram of a coolant circuit of a climate control system according to FIG. 1 in the operating mode "reheating"

FIG. 3 shows the interconnection of a coolant circuit 2 of a climate control system according to FIG. 1 in a third operating mode "reheating." Identical parts are provided with the same reference numerals. The "reheating" operating mode is used for dehumidifying the inside air in the vehicle cabin. In this case, the climate control system simultaneously provides cooling capacity for dehumidifying the inside air and heating capacity for reheating it.

Additional heat source 23 is switched off in the "reheating" operating mode. First shut-off valve 24 is closed and second shut-off valve 25 is open. The multi-way valve located at sixth junction 15 is set such that the coolant flow from evaporator 6 to cooling body 21 is opened. In this case, coolant flows from evaporator 6 via sixth junction 15 and first bypass line 28 to first junction 10 and from first junction 10 further to external heat exchanger 20.

The multi-way valve located at fifth junction 14 is set such that coolant flows from condenser 8 via fifth junction 14 to heating body 22 but the coolant flow from fifth junction 14 to fourth junction 13 is prevented.

The multi-way valve located at first junction 10 is set such that the coolant flow between first junction 10 and third junction 12 via second bypass line 29 is prevented. At the same time, coolant flows from sixth junction 15 via second junction 11 and first bypass line 28 to first junction 10 and from there to external heat exchanger 20. The coolant heated at external heat exchanger 20 then flows via the open second shut-off valve 25 and eighth junction 17 to evaporator 6.

Figure 4:
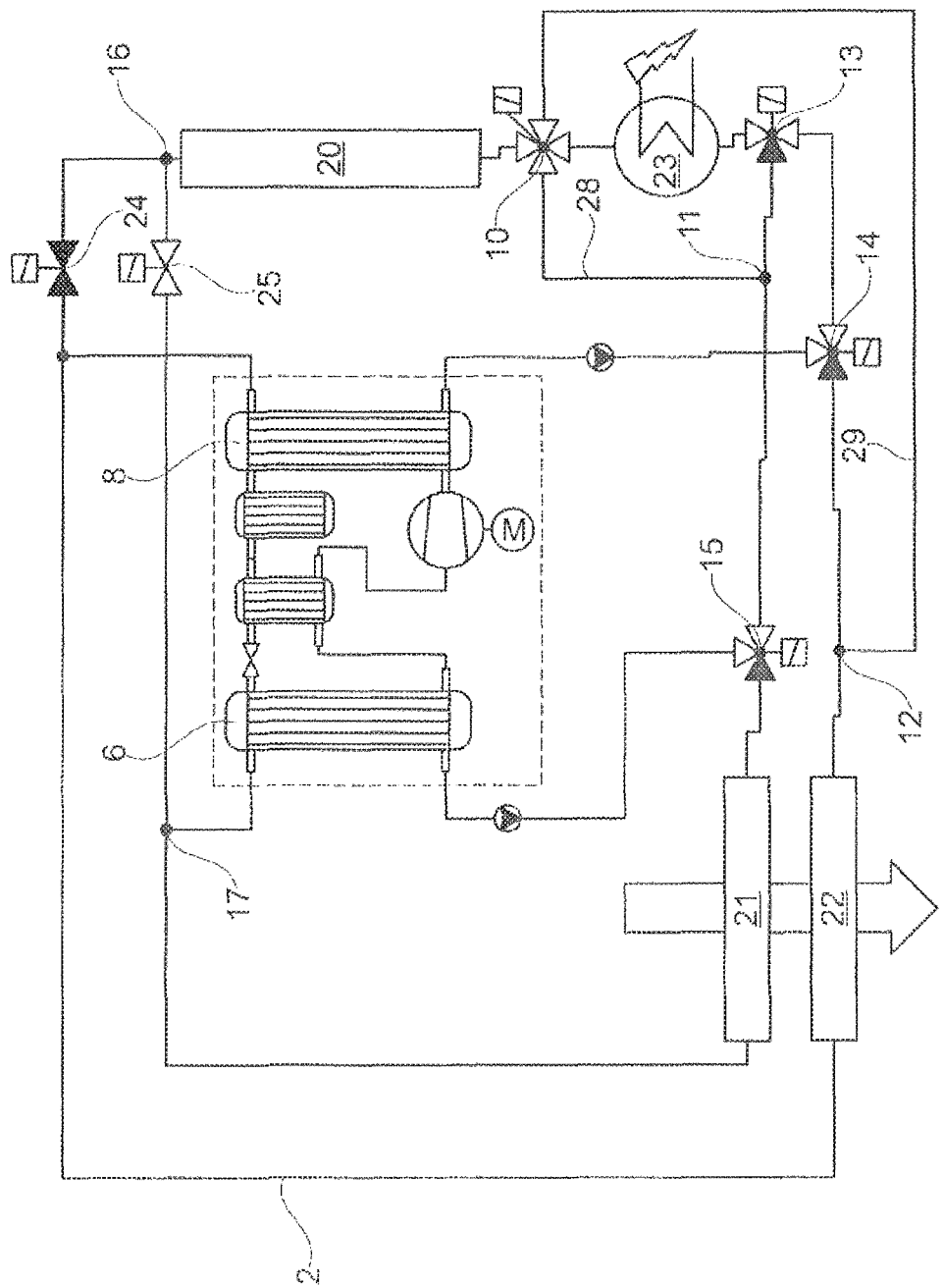
FIG. 4 is a circuit diagram of a coolant circuit of a climate control system according to FIG. 1 in the operating mode "auxiliary heating"

FIG. 4 shows the interconnection of a coolant circuit 2 of a climate control system according to FIG. 1 in a fourth operating mode "auxiliary heating." Identical parts are provided with the same reference numerals. The operating mode "auxiliary heating" is useful if, at low outside temperatures, the heat provided via the external heat exchanger is insufficient to generate a heating capacity by means of which the temperature of the heating body can be raised to the set setpoint value.

Additional heat source 23 is turned on in the "auxiliary heating" operating mode. At the same time, first shut-off valve 24 is closed and second shut-off valve 25 is open. The multi-way valve located at sixth junction 15 is set such that the coolant flow between evaporator 6 and cooling body 21 via sixth junction 15 is prevented. In this case, coolant flows from evaporator 6 via sixth junction 15 to second junction 11 and from second junction 11 via first bypass line 28 to first junction 10. The multi-way valve located at first junction 10 is set here such that coolant flows from first junction 10 to external heat exchanger 20. Coolant flows from external heat exchanger 20 via seventh junction 16, the opened second shut-off valve 25, and eighth junction 17 to evaporator 6.

The multi-way valves located at fifth junction 14 and at fourth junction 13 are set such that coolant flows from condenser 8 via fifth junction 14 and fourth junction 13 to the turned-on additional heat source 23. In this case, the multi-way valve located at first junction 10 is set such that coolant heated by additional heat source 23 flows via first junction 10 and second bypass line 29 to third junction 12 and further to heating body 22.

External heat exchanger 20 may ice over if, for example, at coolant temperatures or outside temperatures below 0° Celsius, moist outside air flows across external heat exchanger 20 and the coolant temperature in external heat exchanger 20 is below 0° Celsius. Due to the formation of ice on external heat exchanger 20, the flow cross-section available for the flow of air decreases and the air-side pressure drop occurring across external heat exchanger 20 increases. In this case, the air mass flow transported via external heat exchanger 20 decreases. However, a reduced air mass flow and an additional heat transfer resistance lead to a reduced heat release to the coolant.

Figure 5:
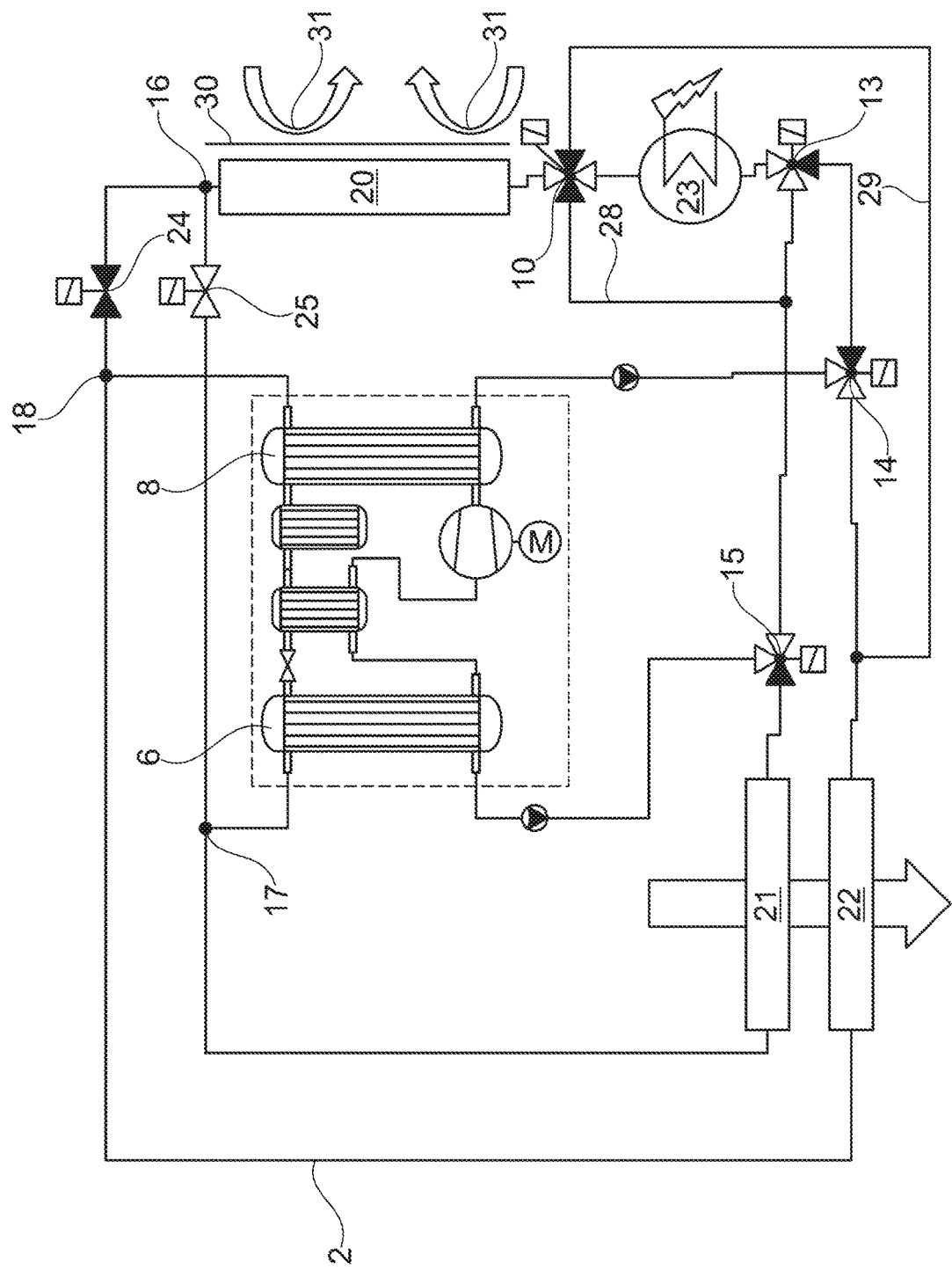
FIG. 5 is a circuit diagram of a coolant circuit of a climate control system according to FIG. 1 in the operating mode "thawing."

For this reason, the climate control system has a fifth operating mode "thawing." The interconnection of a coolant circuit 2 of a climate control system according to FIG. 1 in this fifth operating mode "thawing" is shown in FIG. 5. Identical parts are provided with the same reference numerals.

During the operating mode "thawing," a louver 30 inserted upstream of external heat exchanger 20 prevents cold outside air from flowing across external heat exchanger 20. This is illustrated by arrows 31.

The use of louver 30 is useful, because the cold outside air otherwise slows down the thawing of external heat exchanger 20 brought about by the warm coolant. During the "thawing" operating mode, external heat exchanger 20 is therefore not available as a heat source. Therefore, additional heat source 23 is turned on in the "thawing" operating mode.

At the same time, first shut-off valve 24 is closed and second shut-off valve 25 is open. The multi-way valve located at sixth junction 15 is set such that the coolant flow between sixth junction 15 and cooling body 21 and between eighth junction 17 and cooling body 21 is prevented. In this case, coolant flows from evaporator 6 via sixth junction 15 to fourth junction 13. The multi-way valve located at fourth junction 13 is set such that coolant flows from fourth junction 13 further to the turned-on additional heat source 23 where it is heated. The multi-way valve at first junction 10 disposed upstream of additional heat source 23 is set such that the coolant heated by additional heat source 23 flows via first junction 10 to external heat exchanger 20 and contributes to its de-icing. From external heat exchanger 20, coolant flows via seventh junction 16 and the opened second shut-off valve 25 to eighth junction 17 and from there to evaporator 6.

The multi-way valve located at fifth junction 14 is set moreover such that coolant flows from condenser 8 via fifth junction 14 to heating body 22. Coolant flows from heating body 22 via ninth junction 18 to condenser 8. Moreover, the multi-way valve located at first junction 10 is set such that the coolant flow via first bypass line 28 and the coolant flow via second bypass line 29 are prevented.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A climate control system for a motor vehicle, comprising:
    a refrigerant circuit, which has an evaporator and a condenser; and
    a coolant circuit,
    wherein the refrigerant circuit and the coolant circuit are thermally coupled to each other in a region of the evaporator and in a region of the condenser,
    wherein the coolant circuit has a line system having junctions,
    wherein a heating body, a cooling body, an external heat exchanger, an additional heat source, a first bypass line, and a second bypass line are integrated into the line system,
    wherein the first bypass line is connected between the cooling body and the external heat exchanger and bypasses the additional heat source and wherein the second bypass line is connected between the heating body and the external heat exchanger and bypasses the additional heat source, and
    wherein the additional heat source is an electric heater that is turned on and off depending upon an operating mode of the climate control system,
    wherein the additional heat source is disposed upstream of the external heat exchanger in the flow direction, wherein a first junction which has a multi-way valve, controllable via a controller, and which connects the additional heat source and the external heat exchanger together, is disposed between the additional heat source and the external heat exchanger, and wherein the multi-way valve of the first junction is positioned directly downstream of the additional heat source and directly upstream of the external heat exchanger, such that all fluid that exits the additional heat source flows through the multi-way valve of the first junction and all fluid that flows through the external heat exchanger first flows through the multi-way valve of the first junction.

2. The climate control system according to claim 1, wherein the line system of the coolant circuit is formed of at least two branches, a first branch and a second branch, wherein the first branch has at least the cooling body and a second junction disposed in the flow direction between the cooling body and the additional heat source, and the second branch has at least the heating body and a third junction disposed in the flow direction between the heating body and the additional heat source, wherein the first bypass line connects the second junction to the first junction, such that the first bypass line originates at the second junction and terminates at the multi-way valve of the first junction to bypass the additional heat source and/or the second bypass line connects the third junction to the first junction, such that the second bypass line originates at the third junction and terminates at the multi-way valve of the first junction to bypass the additional heat source.

3. The climate control system according to claim 2, wherein a fourth junction with a multi-way valve, controllable via the controller, is disposed directly upstream of the additional heat source in the flow direction, wherein the fourth junction is connected to the additional heat source and to the second junction, the fourth junction being disposed directly downstream of the second junction.

4. The climate control system according to claim 3, wherein the second branch has a fifth junction with a multi-way valve, controllable via the controller, wherein the fifth junction is connected to the fourth junction and to the third junction and to the condenser.

5. The climate control system according to claim 4, wherein the first branch has a sixth junction with a multi-way valve, controllable via the controller, wherein the sixth junction is connected to the cooling body and to the second junction and to the evaporator.

6. The climate control system according to claim 5, wherein the first branch has a seventh junction and an eighth junction, and the second branch has a ninth junction, wherein the seventh junction is connected to the external heat exchanger and to the eighth junction and to the ninth junction, wherein the eighth junction is connected to the cooling body and to the evaporator, wherein the ninth junction is connected to the condenser and to the heating body, and wherein the seventh junction is disposed directly downstream of the external heat exchanger and is disposed upstream of each of the eighth junction and the ninth junction.

7. The climate control system according to claim 6, wherein a first shut off valve, controllable via a controller, is disposed between the seventh junction and the ninth junction, and/or a second shut-off valve controllable via the controller, is disposed between the seventh junction and the eighth junction.

8. The climate control system according to claim 1, wherein the refrigerant circuit has an expansion tank disposed downstream of the condenser in a refrigerant flow direction, an internal heat exchanger disposed downstream of the condenser and/or downstream of the expansion tank in the refrigerant flow direction, and/or an expansion valve disposed upstream of the evaporator in the refrigerant flow direction, and/or a compressor disposed upstream of the condenser in the refrigerant flow direction.

9. The climate control system according to claim 7, wherein, in a heating operating mode of the climate control system:
the additional heat source is turned off,
the first shut-off valve is closed and the second shut-off valve is open,
the multi-way valve located at the sixth junction is set such that coolant flows from the evaporator to the second junction via the sixth junction and the coolant flow between the sixth junction and the cooling body is prevented,
the multi-way valve located at the fifth junction is set such that coolant flows from the condenser via the fifth junction and the third junction to the heating body, wherein the coolant flow between the fifth junction and the fourth junction is prevented,
the multi-way valve located at the fourth junction is set such that the coolant flow between the second junction and the fourth junction is prevented, and
the multi-way valve located at the first junction is set such that coolant flows from the second junction via the first bypass line and the first junction to the external heat exchanger and the coolant flow between the third junction and the first junction via the second bypass line is prevented.

10. The climate control system according to claim 7, wherein in a cooling operating mode of the climate control system:
the additional heat source is turned off,
the first shut-off valve is open and the second shut-off valve is closed,
the multi-way valve located at the sixth junction is set such that coolant flows from the evaporator and through the multi-way valve at the sixth junction to the cooling body and the coolant flow between the sixth junction and the second junction is prevented,
the multi-way valve located at the fifth junction is set such that the coolant flow between the fifth junction and the third junction and the heating body is prevented, wherein coolant flows from the condenser via the fifth junction to the fourth junction,
the multi-way valve located at the fourth junction is set such that coolant flows from the fifth junction via the fourth junction and the additional heat source to the first junction,
the multi-way valve located at the first junction is set such that coolant flows from the fourth junction via the additional heat source and the first junction to the external heat exchanger, wherein the coolant flow between the second junction and the first junction via the first bypass line and the coolant flow between the third junction and the first junction via the second bypass line are prevented.

11. The climate control system according to claim 7, wherein, in a reheating operating mode of the climate control system:
the additional heat source is turned off,
the first shut-off valve is closed and the second shut-off valve is open,
the multi-way valve located at the sixth junction is set such that the coolant flow from the evaporator via the sixth junction to the cooling body is prevented, wherein coolant flows from the evaporator via the sixth junction to the second junction,
the multi-way valve located at the fifth junction is set such that coolant flows from the condenser and through the multi-way valve at the fifth junction to the heating body, wherein the coolant flow from the fifth junction to the fourth junction is prevented,
the multi-way valve located at the first junction is set such that the coolant flow between the third junction and the first junction via the second bypass line is prevented, wherein coolant flows from the second junction via the first bypass line and the first junction to the external heat exchanger.

12. The climate control system according to claim 7, wherein in an auxiliary heating operating mode of the climate control system:
the additional heat source is turned on,
the first shut-off valve is closed and the second shut-off valve is open,
the multi-way valve located at the sixth junction is set such that the coolant flow between the sixth junction and the cooling body and between the cooling body and the eighth junction is prevented, wherein coolant flows from the evaporator via the sixth junction to the second junction,
the multi-way valve located at the fifth junction is set such that coolant flows from the condenser via the fifth junction to the fourth junction, wherein the coolant flow between the fifth junction and the third junction is prevented,
the multi-way valve located at the fourth junction is set such that the coolant flow between the second junction and the fourth junction is prevented, wherein coolant flows from the condenser via the fifth junction, the fourth junction, and the additional heat source to the first junction,
the multi-way valve located at the first junction is set such that coolant flows from the second junction via the first junction to the external heat exchanger, wherein coolant flows from the fourth junction via the additional heat source and the first junction to the heating body.

13. The climate control system according to claim 7, wherein, in a thawing operating mode of the climate control system:
the additional heat source is turned on,
the first shut-off valve is closed and the second shut-off valve is open,
the multi-way valve located at the sixth junction is set such that the coolant flow between the sixth junction and the cooling body and between the cooling body and the eighth junction is prevented, wherein coolant flows from the evaporator via the sixth junction to the second junction,
the multi-way valve located at the fifth junction is set such that coolant flows from the condenser and through the multi-way valve at the fifth junction to the heating body, wherein the coolant flow from the fifth junction to the fourth junction is prevented,
the multi-way valve located at the fourth junction is set such that coolant flows from the second junction via the fourth junction and the additional heat source to the first junction,
the multi-way valve located at the first junction is set such that coolant flows from the fourth junction via the additional heat source and the first junction to the external heat exchanger, wherein the coolant flow between the second junction and the first junction via the first bypass line and the coolant flow between the third junction and the first junction via the second bypass line are prevented.

14. The climate control system according to claim 8, wherein the internal heat exchanger is disposed between the expansion valve and the expansion tank.

15. The climate control system according to claim 6, wherein the external heat exchanger is disposed directly between the first junction and the seventh junction and wherein the additional heat source is disposed directly between the fourth junction and the first junction.

16. The climate control system according to claim 1, wherein the first junction is a 4-way valve that connects directly to each of the first bypass line, the second bypass line, the external heat exchanger and the additional heat source.

\* \* \* \* \*